United States Patent [19]

Petersen

[11] 4,114,846
[45] Sep. 19, 1978

[54] CABLE CLAMP

[75] Inventor: Poul Petersen, Nordborg, Denmark

[73] Assignee: Danfoss A/S, Nordborg, Denmark

[21] Appl. No.: 622,074

[22] Filed: Oct. 14, 1975

Related U.S. Application Data

[63] Continuation of Ser. No. 483,093, Jun. 26, 1974, abandoned.

[30] Foreign Application Priority Data

Jul. 11, 1973 [DE] Fed. Rep. of Germany ....... 2335209

[51] Int. Cl.² .............................................. F16L 3/22
[52] U.S. Cl. ........................... 248/68 CB; 24/73 AP; 248/73
[58] Field of Search ...................... 248/74 R, 74 A, 73, 248/68 R, 68 CB, 225, 300, DIG. 3; 24/73 AP, 255 AS, 255 C, 73 SA

[56] References Cited

U.S. PATENT DOCUMENTS

| 1,190,971 | 7/1916 | Williams | 248/74 R |
| 2,469,451 | 5/1949 | Burrus | 248/300 X |
| 2,541,828 | 2/1951 | Peck | 248/73 |
| 2,712,917 | 7/1955 | Flora et al. | 248/300 X |
| 3,061,254 | 10/1962 | Piasecki | 248/74 R |
| 3,279,014 | 10/1966 | Fisher | 248/68 CB |
| 3,802,654 | 4/1974 | Jenko et al. | 248/73 |
| 3,916,089 | 10/1975 | Sloan | 248/74 A X |

FOREIGN PATENT DOCUMENTS

| 231,682 | 2/1964 | Austria | 248/74 A |
| 2,001,043 | 9/1969 | France | 248/74 A |
| 2,013,147 | 10/1970 | Fed. Rep. of Germany | 24/73 AP |
| 845,808 | 8/1952 | Fed. Rep. of Germany | 24/73 AP |
| 1,077,821 | 8/1967 | United Kingdom | 24/73 AP |
| 894,867 | 4/1962 | United Kingdom | 248/74 A |

Primary Examiner—Rodney H. Bonck
Attorney, Agent, or Firm—Wayne B. Easton

[57] ABSTRACT

The invention relates to a cable clamp assembly of the type used for fastening electric cables to machinery frames. The assembly has two main parts which are (1) a body member having two slotted openings formed in part by thin flexible wall portions and (2) a base plate attachable to the body member with the resilient portions on the one hand functioning to provide a locking engagement between the body member and base plate and on the other hand being rigidly supported by the base plate. Prior to fastening the base plate to the body member cables may be inserted laterally into the openings by bending the resilient wall portions to sufficiently enlarge the slots to permit the lateral entry of the cable into the opening. The base plate is then fastened to the body member, or vice versa, and the whole assembly is then attached to the frame or casing of a machine. A set screw arrangement is provided for fastening the cable securely in the slotted opening into which the cable was inserted.

1 Claim, 5 Drawing Figures

CABLE CLAMP

This is a Continuation of application Ser. No. 483,093 filed June 26, 1974, and now abandoned.

The invention relates to a cable clamp for a single-core or multi-core cable, in which a clamp body is mounted on a base-plate.

Cable clamps are often used in the immediate proximity of the points where the cable cores are connected in order to relieve the cores of tensile load at these points.

If the cable clamp has a through-opening for the cable, it is not possible to provide the cores with connecting elements, such as terminal plugs or the like, before passing the cores through the opening. For this reason cable clamps are generally of two-part construction such that the opening through which the cable is passed is divided. With this arrangement however there arises the need to provide special fixing means which interconnect the two parts of the clamp body.

It is also known to provide a clamping screw for the purpose of increasing the clamping action or of adapting the cable clamp to suit different diameters of cable.

The object of the invention is to provide a cable clamp of the initially described kind which has a one-piece clamp body but nevertheless permits the cable to be introduced after the connecting elements have been fitted.

According to the invention this object is achieved in that the clamp body has at least one through-opening which surrounds the cable practically completely, in that a slot for pushing through a cable core extends between the opening and a peripheral surface of the clamp body, and in that, on that of its sides that faces the base-plate, the opening is bounded by a thin wall which permits the slot to widen in a resilient manner before the clamp body is mounted on the base-plate, but which is supported by the base-plate after mounting of the clamp body.

When this cable clamp is used, the portions of the cores remaining between the connecting elements and the cable sheathing can be individually introduced without difficulty through the slot into the opening. The cable can then be moved axially until the sheating is located within the opening. Since the slot is able to increase in size in a resilient manner when the cores are being introduced, cores of different sizes can be used and/or a slot which is correspondingly small in the rest condition can be used. Because the resilient part is supported by the base-plate, the clamp body is a substantially rigid structure when finally fitted. In some cases displacement of the resilient part by the base-plate even suffices for firmly clamping the cable.

It is advisable to provide the slot with inclined lead-in faces on the peripheral surface of the clamp body. This facilitates introduction of the cores.

In a first form of construction, the slot is disposed opposite the thin wall. This offers the advantage of providing the greatest width of slot for a given resilience of the thin wall.

In another form of construction, the slot is disposed approximately at right-angles to the thin wall, and a clamping screw lies opposite the thin wall. When tightened, this clamping screw then acts in a direction such as to cause the resilient part of the clamp body to be pressed still more firmly against the base-plate.

It is also advantageous for the clamp body to have a grooved foot which can be pushed into an aperture which is formed in the base-plate and is open at one end, and for a projection to be provided on the resilient part of the clamp body, which projection locks in a recess in the base-plate in the assembled position. The resilience is thus additionally utilized for firmly securing the clamp body, which is simply pushed in, on the base-plate.

The foot of the clamp body can be introduced into the aperature in a particularly simple manner if the base-plate is rounded by bending at the open end of the aperture.

Such a clamp body is preferably produced as an injection moulding of plastics material, for example polyamide. The base-plate is advantageously made of metal.

The invention will now be described in greater detail by reference to two embodiments illustrated in the drawing, in which.

Figure 1:
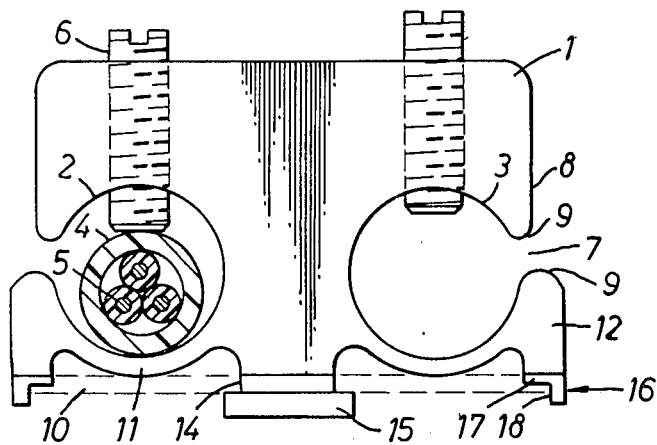
FIG. 1 is a side view of a clamp body usable in accordance with the invention.
Figure 2:
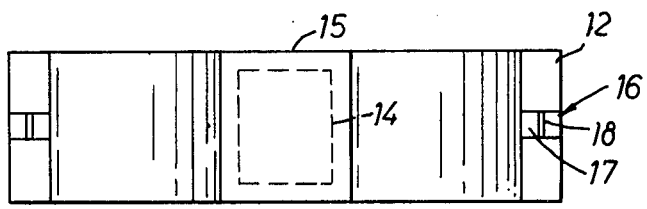
FIG. 2 is an underneath view of the clamp body in FIG. 1.
Figure 3:
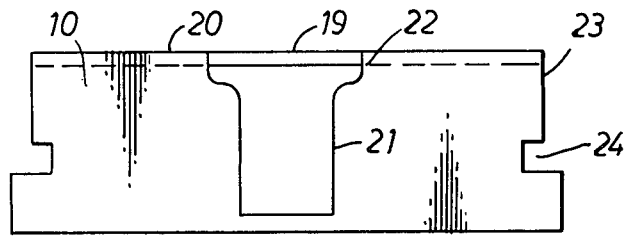
FIG. 3 is a plan view of a base-plate usable with the clamp body.
Figure 2A:
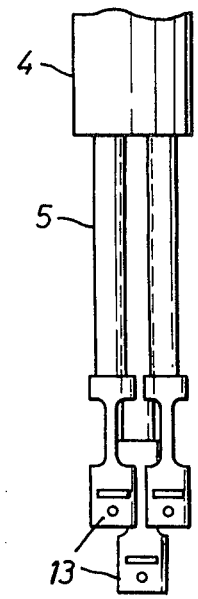
FIG. 2A shows a three core cable of the type which can be held by the clamp.

In the form of construction shown in FIGS. 1–3, a clamp body 1 had two through-openings 2 and 3 in each of which a cable 4 having a plurality of cores can be secured by a clamping screw 6.

The openings 2 and 3 each surround a cable practically completely. Associated with each opening is a slot 7, which extends from the opening to a peripheral will 8 of the clamp body 1 and has inclined lead-in faces 9 at its exterior. At the bottom of the clamp body 1, i.e. at the place where a base-plate 10 will later be fitted, the openings 2 and 3 are each bounded by a thin wall 11 whereby a resilient part 12 of the clamp body is created, this part extending along one side of the slot 7. When this resilient part 12 is bent downwards, the slot 7 becomes widened so that individual cores 5 can be comfortably pushed into it from the side even if, as illustrated in FIG. 2, the cores have already been fitted with plug terminals 13. The cable 4 can then be brought into the correct position by simply displacing it axially.

The clamp body 1 has a foot 15 provided with grooves 14; the clamp body also has a projection 16 on each of the resilient parts 12. Each projection consists of a flat part 17 and an inclined guide part 18.

Part of a plate 19 is bent over at right-angles to form a base-plate 10. The base-plate has an aperture 21 which is open at one end and extends from the curved portion 20 formed by the bending. The width of the aperture 21 is equal to the distance between the grooves 14 in the foot 15. At its open end 22 the width of the aperture corresponds to the foot 15. At each of the outsides is a guide surface 23 adjoined by a recess 24.

When the clamp body 1 is inserted by its foot 15 into the aperture 21 from the open side, the projections 16 slide along the side edges of the base-plate, the flat part 17 being supported on the surface of the base-plate 10 and the inclined part 18 moving along the guide surface 23. As this happens the resilient parts 12 are subjected to a smaller restoring force. As soon as the end position is reached, the flat part 17 locks into the recess 24 under this restoring force, so that the clamp body 1 is firmly mounted on the base-plate 10.

If now the thin wall 11 is supported on the base-plate 10 it can no longer deflect resiliently. The clamp body 1 is therefore substantially stable. The cable 4 can be firmly clamped by tightening the clamping screw 6. Deflection of the thin wall 11 is not possible since it is supported on the base-plate 10.

Figure 4:
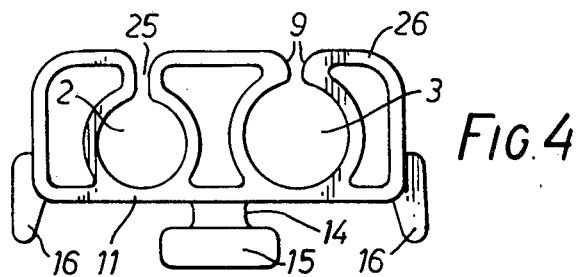
FIG. 4 shows another form of construction of a clamp body.

In the form of construction seen in FIG. 4, parts corresponding to those seen in FIGS. 1-3 are designated by the same reference numerals as are used in those Figures. The main difference is that in the FIG. 4 construction the slots 25 are located on that side of the clamp body 26 that is opposite the thin wall 11, so that each slot can be open wider by the bending of the material. Each slot can therefore be kept smaller for a given core thickness, and, when the clamp is finally fitted, a correspondingly large clamping force can be applied to a cable of diameter corresponding to that of the openings 2 and 3.

I claim:

1. A clamp assembly comprising a body member having two slotted openings formed in part by two flexible wall portions, a foot element between said wall portions connected thereto with a reduced neck formed by grooves, downwardly extending projections respectively on the other sides of said wall portions, a base plate having an apertured slot for receiving said neck, said base plate having two edges on opposite sides thereof, two recesses formed respectively therein in said edges which are spaced from said apertured slot for receiving said projections, said projections and said edges being cooperable during assembly to resiliently stress and displace said flexible wall portions prior to said projections reaching and being received in said recesses after which said flexible wall portions resiliently bias said projections in locking engagement with said recesses to prevent dislodgment of said body member by any external force applied to any part thereof.

* * * * *